(12) United States Patent
Wang et al.

(10) Patent No.: US 11,356,919 B2
(45) Date of Patent: Jun. 7, 2022

(54) HANDOVER METHOD, MOBILITY MANAGEMENT NETWORK ELEMENT, AND COMMUNICATIONS SYSTEM

(71) Applicant: HUAWEI TECHNOLOGIES CO., LTD., Guangdong (CN)

(72) Inventors: Yuan Wang, Shanghai (CN); Yang Xin, Shanghai (CN); Zhongping Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 148 days.

(21) Appl. No.: 16/850,547

(22) Filed: Apr. 16, 2020

(65) Prior Publication Data
US 2020/0245218 A1 Jul. 30, 2020

Related U.S. Application Data

(63) Continuation of application No. PCT/CN2018/110279, filed on Oct. 15, 2018.

(30) Foreign Application Priority Data

Oct. 17, 2017 (CN) .......................... 201710977957.5

(51) Int. Cl.
*H04W 36/32* (2009.01)
*H04W 76/11* (2018.01)
(Continued)

(52) U.S. Cl.
CPC ......... *H04W 36/32* (2013.01); *H04L 61/1511* (2013.01); *H04M 15/66* (2013.01);
(Continued)

(58) Field of Classification Search
CPC ... H04W 36/32; H04W 8/08; H04W 36/0022; H04W 48/18; H04W 76/11;
(Continued)

(56) References Cited

U.S. PATENT DOCUMENTS

2011/0058806 A1 3/2011 Sabet et al.
2015/0296449 A1 10/2015 Shu et al.
(Continued)

FOREIGN PATENT DOCUMENTS

CN 101426243 A 5/2009
CN 101540988 A 9/2009
(Continued)

OTHER PUBLICATIONS

3GPP TR 23.799 V14.0.0 (Dec. 2016);3rd Generation Partnership Project;Technical Specification Group Services and System Aspects;Study on Architecture for Next Generation System(Release 14);total 522 pages.
(Continued)

*Primary Examiner* — Hassan Kizou
*Assistant Examiner* — Abdullahi Ahmed
(74) *Attorney, Agent, or Firm* — Womble Bond Dickinson (US) LLP (57) ABSTRACT

This disclosure relates to the field of wireless communications technologies, and in particular, to a handover method, including: receiving, by a mobility management network element of a first network, a first handover request sent by an access network, and learning that a terminal device needs to be handed over to a second network; obtaining an identifier of the terminal device based on the first handover request; determining, by the mobility management network element of the first network, a target mobility management network element of the second network based on the identifier of the terminal device; and sending, by the mobility management network element of the first network, a second handover request to the target mobility management network element of the second network, and requesting to hand over the terminal device to the second network.

14 Claims, 7 Drawing Sheets

(51) Int. Cl.
*H04L 61/4511* (2022.01)
*H04M 15/00* (2006.01)
*H04W 8/08* (2009.01)
*H04W 36/00* (2009.01)
*H04W 48/18* (2009.01)

(52) U.S. Cl.
CPC ......... *H04W 8/08* (2013.01); *H04W 36/0022* (2013.01); *H04W 48/18* (2013.01); *H04W 76/11* (2018.02)

(58) Field of Classification Search
CPC .............. H04W 36/0033; H04W 8/02; H04W 36/0066; H04W 36/18; H04L 61/1511; H04M 15/66
See application file for complete search history.

(56) References Cited

U.S. PATENT DOCUMENTS

| | | | | |
|---|---|---|---|---|
| 2018/0376384 | A1* | 12/2018 | Youn | H04W 36/0022 |
| 2019/0166523 | A1* | 5/2019 | Shaw | H04W 48/04 |
| 2019/0223061 | A1* | 7/2019 | Deng | H04W 36/0022 |
| 2019/0261233 | A1* | 8/2019 | Duan | H04W 36/14 |
| 2019/0335365 | A1* | 10/2019 | Ying | H04W 36/0022 |
| 2020/0112898 | A1* | 4/2020 | Ramle | H04W 36/08 |
| 2020/0178139 | A1* | 6/2020 | Shimojou | H04W 92/24 |
| 2020/0359291 | A1* | 11/2020 | Ramle | H04W 48/18 |

FOREIGN PATENT DOCUMENTS

| | | |
|---|---|---|
| CN | 101795475 A | 8/2010 |
| CN | 101841824 A | 9/2010 |
| CN | 102104867 A | 6/2011 |
| CN | 103228016 A | 7/2013 |
| CN | 103298050 A | 9/2013 |
| CN | 104380797 A | 2/2015 |
| CN | 104737588 A | 6/2015 |
| CN | 102378359 B | 2/2016 |
| CN | 107040481 A | 8/2017 |
| CN | 104521284 B | 5/2018 |
| WO | 2017172265 A1 | 10/2017 |

OTHER PUBLICATIONS

Ericsson,"23.501: 5GC-EPC interworking",SA WG2 Meeting #119 S2-170804,Feb. 13-17, 2017 Dubrovnik, Croatia, total 7 pages.
Secretary of SA WG2, Draft Report of SA WG2 meetings #118BIS. SA WG2 Meeting #119, Feb. 13-17, 2017, Dubrovnik, Croatia, S2-170703, 246 pages.
Zhang Ping et al., Survey of several key technologies for 5G. Journal on Communications, vol. 37 No. 7, Jul. 2016, 15 pages.
3GPP TS 23.502 V1.2.0 (Sep. 2017), 3rd Generation Partnership Project;Technical Specification Group Services and System Aspects;Procedures for the 5G System;Stage 2 (Release 15), 165 pages.
NTT DOCOMO, NEC, Network slicing interworking with eDEcor for TS 23.501. SA WG2 Meeting #120, Mar. 27-31, 2017, Busan, South Korea, S2-172200, 3 pages.
ZTE, NW Slicing Mobility in Inter-System Scenario. 3GPP TSG RAN WG3 Meeting #95 , Athens, Greece, Feb. 13-17, 2017, R3-170538, 2 pages.
ZTE, TS 23.501 pCR on MME selection and without N26 for the interworking between slicing and DCN. SA WG2 Meeting #124, Nov. 27-Dec. 1, 2017, Reno, Nevada, USA, S2-178743, 2 pages.

* cited by examiner

HANDOVER METHOD, MOBILITY MANAGEMENT NETWORK ELEMENT, AND COMMUNICATIONS SYSTEM

CROSS-REFERENCE TO RELATED APPLICATIONS

This application is a continuation of International Application No. PCT/CN2018/110279, filed on Oct. 15, 2018, which claims priority to Chinese Patent Application No. 201710977957.5, filed on Oct. 17, 2017, The disclosures of the aforementioned applications are hereby incorporated by reference in their entireties.

TECHNICAL FIELD

This disclosure relates to the field of wireless communications technologies, and in particular, to a handover method, a mobility management network element, and a communications system in a wireless communications system.

BACKGROUND

In a 4G system, an operator deploys different core networks for different types of terminal devices (for example, mobile broadband communication Mobile Broadband Communication, machine type communication Machine Type Communication, vehicle type communication Vehicle type communication, and public safety communication Public Safety Communication), and the core networks may be referred to as dedicated core networks (DCN for short). A dedicated core network may serve a terminal device of a specific type, for example, a machine type communication terminal device is served by a particular dedicated core network supporting the machine type communication; or the dedicated core network may serve a universal type terminal device, for example, a universal terminal device is served by a particular default dedicated core network supporting a universal service. Different dedicated core networks include core network devices supporting different terminal device types or service types, for example, a mobility management entity (MME), a serving gateway (SGW), and a data gateway (PGW). The DCN helps the operator to manage and maintain terminal devices having different usage types in a targeted manner. A dedicated network is used in a dedicated manner. This improves efficiency of access mobility management and session management of the terminal devices and reduces network maintenance costs.

In a 5G system, a network may be divided into a plurality of logical core network network slice instances by using a slicing technology on the same set of physical devices of a core network, and each of the core network network slice instances may be customized based on a specific commercial scenario or a user demand, to ensure mutual isolation between network slice instances when diverse services are satisfied. A network slice includes an access and mobility management function( ) a session management function (SMF), a user plane function (UPF), and the like. The operator may freely and flexibly combine network performance indexes such as a rate, a capacity, a coverage rate, a delay, reliability, security, and availability, to provide a customized network function, thereby satisfying a specific requirement of each usage scenario.

In an actual usage scenario, a movement of the terminal device may cause a handover between systems, that is, the terminal device moves from an area covered by the 5G system to an area covered by the 4G system. An interoperation between the 4G system and the 5G system is an important guarantee of service continuity between the systems. Due to introduction of the foregoing dedicated core network and network slice, when the terminal device is handed over from the 5G network to the 4G network, there is a need to ensure that the terminal device can be served by a correct DCN. For example, a vehicle type communication terminal device, the terminal device is served by a core network network slice supporting a vehicle type communication service in the 5G system. When the terminal device moves from 5G to 4G, the 5G network should select, for the terminal device, a DCN that can support the vehicle type communication service in the 4G. Because the 4G system may have a plurality of DCNs supporting different services, if the 5G network selects an in correct DCN for the terminal device, for example, a universal DCN, the selected DCN may fail to serve the terminal device, thereby causing service interruption of the terminal device.

SUMMARY

This specification describes a handover method, a mobility management network element, and a communications system, to resolve a problem of selecting a proper mobility management network element for a terminal device during a handover.

One embodiment of the present disclosure provides a handover method, including: receiving, by a mobility management network element of a first network, a first handover request sent by an access network of the first network, and learning that a terminal device should be handed over to a second network; obtaining, by the mobility management network element of the first network, an identifier of the terminal device based on the first handover request; determining, by the mobility management network element of the first network, a target mobility management network element of the second network based on the identifier of the terminal device; and sending, by the mobility management network element of the first network, a second handover request to the target mobility management network element of the second network, and requesting to hand over the terminal device to the second network.

In one embodiment, the determining, by the mobility management network element of the first network, a target mobility management network element of the second network based on the identifier of the terminal device includes: obtaining, by the mobility management network element of the first network, a usage type of the terminal device from a subscription database based on the identifier of the terminal device; and determining, by the mobility management network element of the first network, the target mobility management network element of the second network based on the usage type of the terminal device.

In one embodiment, the determining, by the mobility management network element of the first network, the target mobility management network element of the second network based on the usage type of the terminal device includes: sending, by the mobility management network element of the first network to a DNS or an NRF, a query request carrying the usage type of the terminal device; and receiving target mobility management network element information of the second network returned by the DNS or the NRF.

In a possible design, the determining, by the mobility management network element of the first network, a target mobility management network element of the second network further based on the identifier of the terminal device further includes: obtaining, by the mobility management network element of the first network, a target core network identifier of the second network based on the identifier of the terminal device; and determining, by the mobility management network element of the first network, the target mobility management network element of the second network based on the target core network identifier of the second network.

In one embodiment, the obtaining, by the mobility management network element of the first network, a target core network identifier of the second network based on the identifier of the terminal device includes: obtaining, by the mobility management network element of the first network, slice information of the terminal device from a context of the terminal device based on the identifier of the terminal device; obtaining a correspondence between a core network identifier of the second network and the slice information; and determining the target core network identifier of the second network based on the slice information of the terminal device and the correspondence.

In one embodiment, the obtaining a correspondence between a core network identifier of the second network and the slice information includes: sending, by the mobility management network element of the first network, a request message to a policy control function PCF; and receiving, by the mobility management network element of the first network, a correspondence table that is of the core network identifier of the second network and the slice information and that is returned by the PCF.

In one embodiment, if the first handover request further carries location information of the terminal device, and the correspondence table of the core network identifier and the slice information further includes the location information, the mobility management network element of the first network may determine the target core network identifier of the second network based on the slice information of the terminal device, the location information of the terminal device, and the correspondence.

In one embodiment, if there are a plurality of pieces of slice information of the terminal device, and the plurality of pieces of slice information of the terminal device are configured with priority information, the block of determining the target core network identifier of the second network based on the slice information of the terminal device and the correspondence includes: determining the target core network identifier of the second network based on slice information with a highest priority in the slice information of the terminal device and the correspondence.

In one embodiment, the obtaining, by the mobility management network element of the first network, a target core network identifier of the second network based on the identifier of the terminal device includes: sending, by the mobility management network element of the first network, the identifier of the terminal device to a first mobility management network element of the second network; and receiving the target core network identifier of the second network returned by the first mobility management network element of the second network based on the identifier of the terminal device.

In one embodiment, the obtaining, by the mobility management network element of the first network, a target core network identifier based on the identifier of the terminal device includes: querying a context of the terminal device based on the identifier of the terminal device, and obtaining the target core network identifier of the second network.

In one embodiment, the method further includes: receiving, by the mobility management network element of the first network, a registration request of the terminal device, where the registration request includes a core network identifier of the second network of the terminal device; and storing, by the mobility management network element of the first network, the core network identifier of the second network, where the core network identifier of the second network is stored in the context of the terminal device.

In one embodiment, the determining, by the mobility management network element of the first network, the target mobility management network element of the second network based on the target core network identifier of the second network includes: sending, by the mobility management network element of the first network to a DNS or an NRF, a query request carrying the target core network identifier of the second network; and receiving target mobility management network element information of the second network returned by the DNS or the NRF.

In one embodiment, the determining, by the mobility management network element of the first network, a target mobility management network element of the second network based on the identifier of the terminal device includes: sending, by the mobility management network element of the first network, a request message to a first mobility management network element of the second network, and requesting to hand over the terminal device to the second network, where the request message carries the identifier of the terminal device; and receiving second mobility management network element information of the second network returned by the first mobility management network element of the second network.

According to one embodiment, this disclosure provides another handover method, including: receiving, by a first mobility management network element of a second network, a request message sent by a mobility management network element of a first network, where the request message carries an identifier of a terminal device; obtaining a usage type of the terminal device from subscription data based on the identifier of the terminal device; determining a target core network identifier of the second network based on the usage type of the terminal device; and returning the target core network identifier of the second network to the AMF; or determining a target mobility management network element of the second network based on the target core network identifier of the second network, and returning target mobility management network element information of the second network to the AMF; or determining a target mobility management network element of the second network based on the target core network identifier of the second network, and sending the request message to the target mobility management network element of the second network.

In one embodiment, the target mobility management network element information of the second network in the foregoing aspects includes: an identifier of the target mobility management network element, or an access address of the target mobility management network element.

In one embodiment, the first network is a 5G network, the mobility management network element of the first network is an AMF, and the second network is a 4G network.

One embodiment of the present disclosure provides a mobility management network element, and the mobility management network element is a mobility management network element implementing examples of the handover method according to the first aspect. A function may be implemented by hardware, or may be implemented by hardware by executing corresponding software. The hardware or the software includes one or more units or modules corresponding to the foregoing function.

In one embodiment, a structure of the mobility management network element may include a transceiver unit and a processing unit, where the processing unit is configured to support the mobility management network element in performing a corresponding function in the handover method according to the first aspect. The transceiver unit is configured to support communication between the mobility management network element and another device. The mobility management network element may further include a storage unit, where the storage unit is configured to be coupled to the processing unit, and the storage unit stores a program instruction and data that are necessary to the mobility management network element. In an example, the processing unit may be a processor, the transceiver unit may be a communications interface, and the storage unit may be a memory.

According to one embodiment, an embodiment of the present disclosure provides a mobility management network element, and the base station is a mobility management network element implementing examples of the handover method according to the second aspect. The function may be implemented by hardware, or may be implemented by hardware by executing corresponding software. The hardware or the software includes one or more units or modules corresponding to the foregoing function.

In one embodiment, a structure of the mobility management network element may include a transceiver unit and a processing unit, where the processing unit is configured to support the mobility management network element in performing a corresponding function in the handover method according to the second aspect. The transceiver unit is configured to support communication between the mobility management network element and another device. The mobility management network element may further include a storage unit, where the storage unit is configured to be coupled to the processing unit, and the storage unit stores a program instruction and data that are necessary to the mobility management network element. In an example, the processing unit may be a processor, the transceiver unit may be a communications interface, and the storage unit may be a memory.

One embodiment of the present disclosure provides a communications system, and the system includes the mobility management network element according to any one of the foregoing aspects.

In one embodiment, the system may further include another device such as an HSS, or a UDM that interacts with the mobility management network element in the solutions provided in embodiments of the present disclosure.

According to one embodiment, this disclosure further provides a computer-readable storage medium. The computer-readable storage medium stores an instruction, and when the instruction is run on a computer, the computer is enabled to perform the method according to any one of the foregoing aspects. The computer, for example, may be a mobility management network element.

According to one embodiment, this disclosure provides a computer program product. The computer program product includes a computer software instruction, and the computer software instruction may be loaded by using a processor to implement the procedure in the handover method according to any design of any one of the foregoing aspects.

According to one embodiment, this disclosure provides an apparatus. The apparatus includes a processor, used by a source base station to implement the function in the foregoing aspects, for example, generating or processing data and/or information in the foregoing method.

In one embodiment, the apparatus further includes a memory. The memory is configured to store a necessary program instruction and data.

In one embodiment, the apparatus may be a chip system.

In one embodiment, the chip system may include a chip, or may include a chip and another discrete device.

Compared with the prior art, some embodiments of this disclosure describe the handover method, the mobility management network element, and the communications system, to select a proper target mobility management network element to provide a service for the terminal device, thereby avoiding service interruption of the terminal device.

BRIEF DESCRIPTION OF DRAWINGS

The following describes in more details embodiments of this disclosure with reference to the accompanying drawings.

DESCRIPTION OF EMBODIMENTS

The following clearly describes the technical solutions in embodiments of this disclosure with reference to the accompanying drawings in the embodiments of this disclosure.

Figure 1:
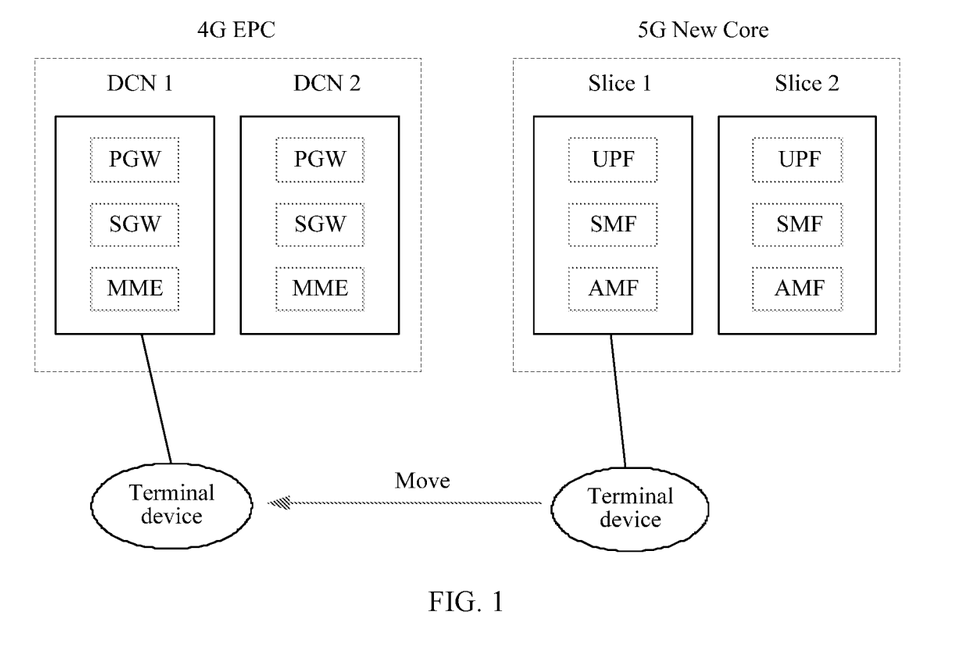
FIG. 1 is a schematic diagram of a possible network architecture according to this disclosure.

FIG. 1 is a diagram of possible network architecture according to an embodiment of this disclosure.

A terminal device may be referred to as user equipment (UE), a mobile station (MS), a mobile terminal device, a terminal device in a future 5G network, or the like. The terminal device may communicate with one or more core networks (for example, a network slice) through a radio access network (RAN), or may communicate with another terminal device, for example, communication in a scenario of device-to-device (D2D) or machine-to-machine (M2M). For example, the terminal device may be a mobile phone (or referred to as a "cellular" phone), a computer having a mobile terminal device, or the like, for example, the terminal device may be further a handheld device, a vehicle-mounted device, a wearable device, a computing device, and a controlling device that have a wireless communication function, or another processing device connected to a wireless modem. For ease of description, in this disclosure, the devices mentioned above are collectively referred to as the terminal device.

A 4G core network EPC includes network devices such as a mobility management network element (MME), a serving gateway (SGW), a data network (PGW), a home subscriber server (HSS). The MME is a control node in an LTE access network, and is connected to a 4G RAN through an S1-MME path. The MME is responsible for performing track and page control on the terminal device in an idle mode. The SGW is responsible for routing and forwarding a data packet of the terminal device, and is also responsible for user plane data exchange when the terminal device moves between 4G RANs or between the 4G RAN and another 3GPP technology. The PGW is connected to the SGW through an s5 path, to implement interface transmission of a connection point between the terminal device and an external service PDN. One terminal device may simultaneously access a plurality of service PDNs through a plurality of PGWs. The HSS (not shown in the figure) is functioned as a central database, including subscription information related to the terminal device and information related to subscription. A function of the HS S includes mobility management, support of calling and session establishment, and user authentication and access authorization.

A 5G core network New Core includes network devices such as an access and mobility management function (AMF), a session management function (SMF), a user plane function (UPF), and a unified data management (UDM) network element. The AMF is responsible for a registration procedure during access of the terminal device and location management in a moving process of the terminal device. The SMF is responsible for establishing a corresponding session connection on a network side when the terminal device initiates a service, and providing a specific service for the terminal device, especially delivering a data packet forwarding policy, a QoS policy, and the like to the UPF based on an N4 interface between the SMF and the UPF. The UPF is mainly responsible for data packet forwarding, quality of service (QoS) control, charging information statistics, and the like. The UDM is a database, and stores the subscription information related to the terminal device. The PCF is a policy control function in the network, and stores a local policy or a roaming policy of the network.

In the prior art, when a handover is performed between a 5G system and a 4G system, a 5G RAN notifies the AMF that a handover is needed due to a movement of the terminal device. The AMF confirms an area in which there is a need to hand over to the 4G system, and the AMF selects an MME, sends a handover request to the MME, adds a context of the terminal device to the handover request for sending to the selected MME. Then, the MME completes a subsequent handover block, for example, establishing a 4G system context and a 4G bearer of the terminal device. However, in the prior art, how to determine the MME by the AMF is not described in detail.

The prior art has the following problem: an operator network deploys a 5G core network in an area A, the 5G core network includes two network slices, and the network slices are respectively a slice 1 serving a vehicle type terminal device and a slice 2 serving a machine type terminal device. The network slice includes network functions such as the AMF, the SMF, and the UPF. In addition, the operator deploys only a 4G core network in an area B, the 4G core network includes two DCNs, and the DCNs are respectively a DCN 1 serving the vehicle type terminal device and a DCN 2 serving a mobile broadband type terminal device. The DCN includes network elements such as the MME, the SGW, and the PGW. Currently, a vehicle type terminal device in the area A accesses the slice 1 providing a service in the 5G system. When the terminal device moves from the area A to the area B, the terminal device should be handed over from the 5G system to the 4G system. Because the 4G system deploys the two DCNs, and the DCN 1 can serve the vehicle type terminal device, while the DCN 2 cannot serve the vehicle type terminal device. To ensure service continuity when the terminal device is handed over, the terminal device should be handed over from the slice 1 to the DCN 1. However, in the prior art, the AMF in the slice 1 may incorrectly select the MME in the DCN 2, so that the DCN 2 cannot serve the terminal device.

Figure 2:
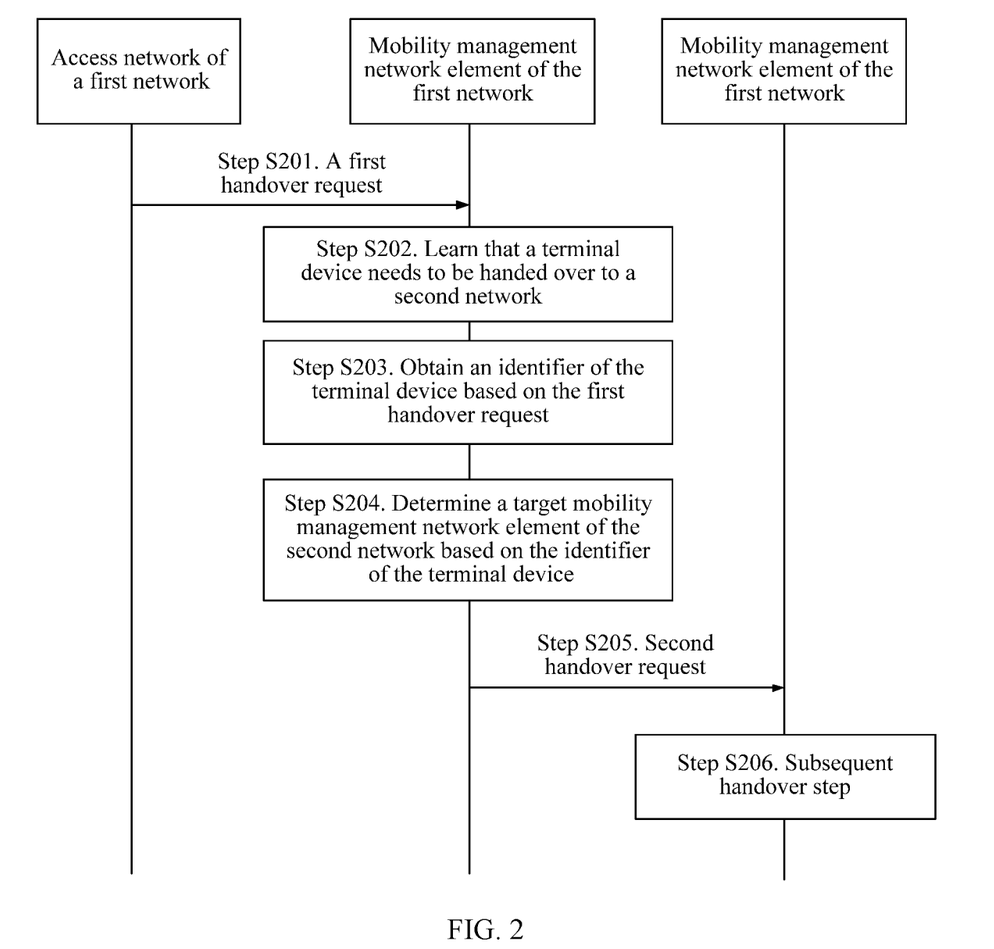
FIG. 2 is a schematic flowchart of a handover method according to an embodiment of this disclosure.

Based on the network architecture in FIG. 1, FIG. 2 is a schematic flowchart of a handover method according to an embodiment of this disclosure.

Block S201. An access network of a first network sends a first handover request to a mobility management network element of the first network.

The first network may be a 5G network, a second network may be a 4G network, the mobility management network element of the first network is an AMF, and a mobility management network element of the second network is an MME.

The first handover request carries an interface identifier or an identifier of a terminal device.

The interface identifier may be a channel identifier between the access network and the mobility management network element, for example, an interface identifier (S1-ID, N2-ID).

The identifier of the terminal device is an identifier that can identify or recognize the terminal device in a network, and may be specifically a permanent identifier of the terminal device, for example, a subscription permanent identifier (SUPI), or may be a temporary identifier of the terminal device, for example, a 5G-GUTI.

Optionally, the first handover request may further carry an instruction used to notify the mobility management network element of the first network that the terminal device should be handed over to the second network, or carries an identifier of a target area (for example, a target access network node identifier).

Optionally, the first handover request may further carry location information of the terminal device.

Optionally, the first handover request may further carry a target PLMN ID.

Block S202. The mobility management network element of the first network learns that the terminal device should be handed over to a second network.

Specifically, the first handover request may directly indicate that the terminal device should be handed over to the second network, or the mobility management network element of the first network may learn, based on the identifier that is of the target area and that is carried in the first handover request, that the terminal device should be handed over to the second network.

Block S203. The mobility management network element of the first network obtains an identifier of the terminal device based on the first handover request.

If the interface identifier is carried in the first handover request, the mobility management network element determines the identifier of the terminal device based on a correspondence between the interface identifier and the identifier of the terminal device.

If the identifier of the terminal device is carried in the first handover request, the mobility management network element directly obtains the identifier of the terminal device.

Block S204. The mobility management network element of the first network determines a target mobility management network element of the second network based on the identifier of the terminal device.

Specifically, the foregoing blocks may be implemented in any one of the following three manners.

Manner 1: The mobility management network element of the first network obtains a usage type of the terminal device from a subscription database based on the identifier of the terminal device; and the mobility management network element of the first network determines the target mobility management network element of the second network based on the usage type of the terminal device. For example, the mobility management network element of the first network may send, to a domain name server (DNS) or a network repository function (NRF), a query request carrying the usage type of the terminal device, and receive target mobility management network element information of the second network returned by the DNS or the NRF.

The usage type of the terminal device is a type defined for the terminal device in the 4G network based on a service type of the terminal device and/or a terminal device capability, for example, may be a Usage Type of the terminal device. The usage type is used as subscription data of a user and stored in the subscription database.

Manner 2: The mobility management network element of the first network obtains a target core network identifier of the second network of the terminal device based on the identifier of the terminal device, and determines the target mobility management network element of the second network based on the target core network identifier of the second network. For example, the mobility management network element of the first network queries the DNS server or the network repository function (NRF) based on the target core network identifier of the second network, and obtains the target mobility management network element information that is of the second network and that is corresponding to the target core network identifier of the second network. Mobility management network element information may be an identifier of the mobility management network element, an access address of the mobility management network element, or the like.

The core network identifier is used to identify a core network, and specifically, a DCN ID may be used for identification. Different DCN IDs may be allocated to a universal core network and a dedicated core network for distinguishing.

Specifically, an obtaining process of obtaining the target core network identifier of the second network of the terminal device based on the identifier of the terminal device may be implemented in any one of the following three manners.

In a first manner, the mobility management network element of the first network obtains slice information of the terminal device from a context of the terminal device based on the identifier of the terminal device, obtains a correspondence between the core network identifier of the second network and the slice information, and determines the target core network identifier of the second network based on the slice information of the terminal device and the correspondence.

The slice information identifies a network slice accessed or subscribed by the terminal device, for example, a type of the slice or an identifier of the slice, and may be specifically subscribed. The mobility management network element of the first network may obtain the slice information of the terminal device in a registration process of the terminal device, and store the slice information in the context of the terminal device. A related specific process is not described again. Optionally, if there are a plurality of pieces of slice information of the terminal device, and there is priority information corresponding to the slice information, the mobility management network element of the first network may determine the target core network identifier of the second network based on slice information with a highest priority in the slice information of the terminal device and the correspondence.

It may be understood that, the block of obtaining the slice information of the terminal device from the context of the terminal device based on the identifier of the terminal device and the block of obtaining the correspondence between the core network identifier of the second network and the slice information may not be performed in sequence, or may be performed at the same time.

Specifically, that the mobility management network element of the first network obtains a correspondence between the core network identifier of the second network and the slice information may be implemented in the following manner: The mobility management network element of the first network obtains, from a PCF, the correspondence between the core network identifier of the second network and the slice information. For example, the mobility management network element of the first network sends a request message to the PCF, the PCF returns a response message to the mobility management network element of the first network, and the response message includes a correspondence table of the core network identifier and the slice information.

Optionally, if the first handover request further carries the location information of the terminal device, and the correspondence table of the core network identifier and the slice information further includes the location information, the mobility management network element of the first network may determine the target core network identifier of the second network based on the slice information of the terminal device, the location information of the terminal device, and the correspondence.

For details of the correspondence table of the core network identifier and the slice information, refer to Table 1:

TABLE 1

Correspondence between a core network identifier and slice information

| Slice information | Location information (optional) | Core network identifier |
|---|---|---|
| 100 | Shanghai | 001 |
| 101 | Shanghai | 002 |
| 100 | Beijing | 010 |
| 102 | Beijing | 111 (default) |

The correspondence table of the core network identifier and the slice information may include but is not limited to the correspondence table of the core network identifier of the second network and the slice information of the first network, for example, may further include a core network identifier of a third network and the slice information.

Optionally, if the mobility management network element of the first network obtains a PLMN ID of the second network (for example, the first handover request in S201 carries the PLMN ID of the second network), and the request message sent by the mobility management network element of the first network to the PCF may carry the PLMN ID of the second network, the correspondence table of the core network identifier of the second network and the slice information is returned by the PCF. For example, a handover is performed from a first network of a PLMN A to a second network of a PLMN B. For details of the correspondence table, refer to Table 2:

TABLE 2

Correspondence table of a first network of
a PLMN A and a second network of a PLMN B

| Slice information of the first network of the PLMN A | Location information (optional) | Core network identifier of the second network of the PLMN B |
|---|---|---|
| 100 | Shanghai | 010 |
| 101 | Shanghai | 011 |
| 100 | Beijing | 020 |
| 102 | Beijing | 000 (default) |

In a second manner, the mobility management network element of the first network obtains the target core network identifier of the second network from the context of the terminal device based on the identifier of the terminal device.

For example, a home network HPLMN of the terminal device pre-configures a core network identifier that can be accessed by the terminal device (including but not limited to the core network identifier of the second network) for the terminal device, and stores the core network identifier in the terminal device or a SIM card. When initiating registration to the network, the terminal device sends the pre-configured core network identifier that can be accessed to the mobility management network element of the first network (for example, through a registration request message registration request message), and the mobility management network element of the first network stores, in the context of the terminal device, the core network identifier that can be assessed by the terminal device. When the terminal device should be handed over to the second network, the mobility management network element of the first network may obtain the target core network identifier of the second network from the stored context of the terminal device based on the identifier of the terminal device.

In a third manner, the mobility management network element of the first network sends the identifier of the terminal device to a first mobility management network element of the second network, and receives the target core network identifier of the second network returned by the first mobility management network element of the second network based on the identifier of the terminal device.

The first mobility management network element of the second network may be a special default mobility management network element of the second network, or may be a mobility management network element that is of the second network and that is randomly selected by the mobility management network element of the first network.

Specifically, the mobility management network element of the first network sends a request message (for example, a second handover request or a query request) to the first mobility management network element of the second network, and the request message includes the identifier of the terminal device. The first mobility management network element of the second network obtains the usage type Usage type of the terminal device from subscription data based on the identifier of the terminal device (for example, the first mobility management network element sends subscription data query request to an HSS, the subscription data query request includes the identifier of the terminal device, the HSS returns subscription data information corresponding to the terminal device to the first mobility management network element, and the subscription data includes the usage type of the terminal device). The first mobility management network element obtains the target core network identifier of the second network of the terminal device based on the usage type (for the block, refer to descriptions in the prior art). The first mobility management network element returns the target core network identifier of the second network to the mobility management network element of the first network.

Manner 3: The mobility management network element of the first network sends the request message (for example, the second handover request or the query request) to the first mobility management network element of the second network, and requests to hand over the terminal device to the second network, where the request message carries the identifier of the terminal device; and receives second mobility management network element information of the second network returned by the first mobility management network element of the second network.

Specifically, the first mobility management network element of the second network receives the request message sent by the mobility management network element of the first network, where the request message carries the identifier of the terminal device. The first mobility management network element of the second network obtains the usage type of the terminal device from the subscription data based on the identifier of the terminal device. The first mobility management network element of the second network determines the target core network identifier of the second network based on the usage type of the terminal device, determines the target mobility management network element of the second network based on the target core network identifier of the second network, and returns the target mobility management network element information of the second network to the mobility management network element of the first network, or may send the request message to the target mobility management network element of the second network.

Optionally, a manner of returning the target mobility management network element information of the second network by the first mobility management network element to the mobility management network element of the first network further includes: If the first mobility management network element can support a target core network of the second network, the first mobility management network element performs a subsequent handover block. If the first mobility management network element cannot support the target core network of the second network, the first mobility management network element determines a mobility management network element that is of the second network and that is corresponding to the target core network identifier of the second network again and uses the mobility management network element as a target mobility management network element. A correspondence between the mobility management network element of the second network and the core network identifier of the second network is configured on a default MME.

Block S205. The mobility management network element of the first network sends a second handover request to the target mobility management network element of the second network, and requests to hand over the terminal device to the second network.

Specifically, the mobility management network element of the first network obtains a session context (SM Context) of the terminal device from an SMF, and simultaneously obtains a mobility management context (MM Context) of the terminal device based on the context of the terminal device stored by the mobility management network element of the first network. The mobility management network element of the first network sends the second handover request to the target mobility management network element of the second network, and the second handover request carries the SM context and the MM context of the terminal device.

Block S206. The target mobility management network element of the second network completes a subsequent handover block, for example, establishing a context and a bearer in the second network for the terminal device.

In this embodiment of this disclosure, a proper mobility management network element of the second network may be found for the terminal device, to serve the terminal device, thereby avoiding service interruption of terminal device.

Based on the network architecture of FIG. 1, FIG. 3, FIG. 4, FIG. 5, and FIG. 6 may respectively describe the method described in FIG. 2 in detail with reference to specific embodiments of this disclosure.

Figure 3:
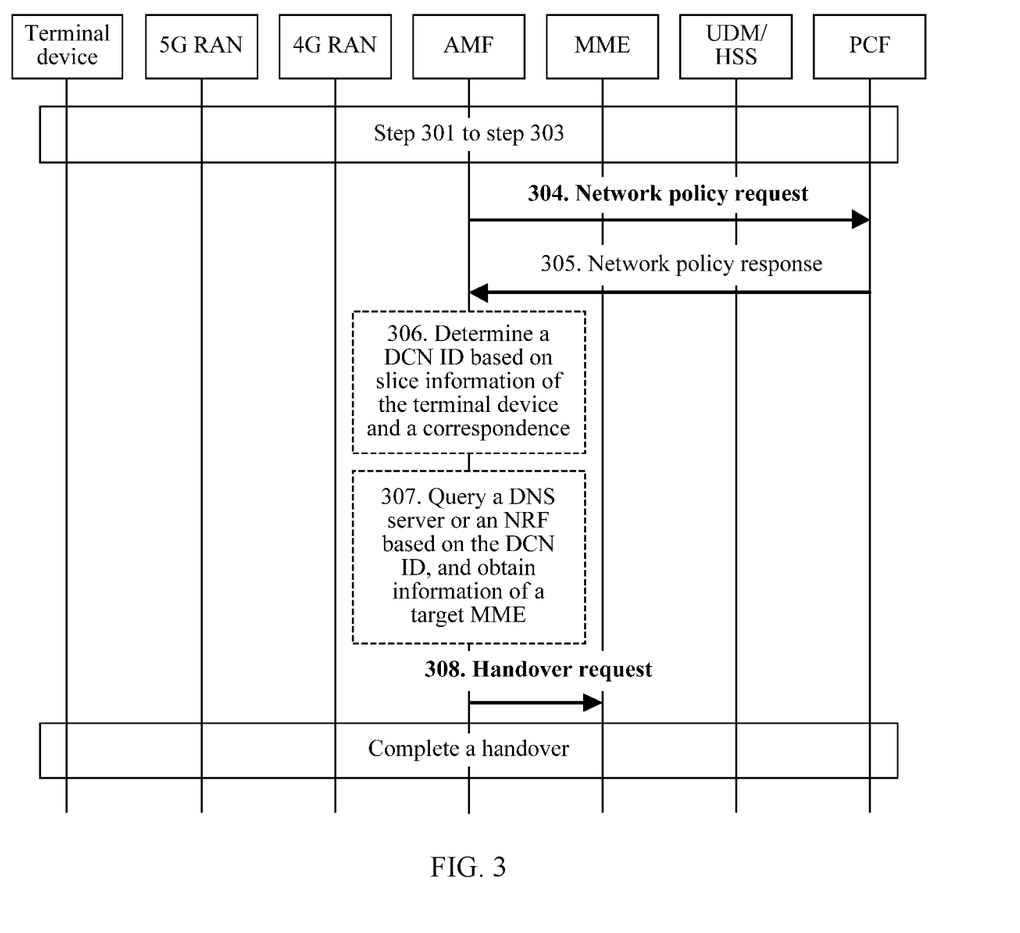
FIG. 3 is a signaling interworking diagram according to an embodiment of this disclosure.

FIG. 3 is a signaling interworking diagram according to an embodiment of this disclosure, where 5G is used as an example of a first network, 4G is used as an example of a second network, an AMF is used as an example of a mobility management network element of the first network, and an MME is used as an example of a mobility management network element of the second network for description. It may be understood that, the AMF may be replaced with the mobility management network element of the first network, and a target MME may be replaced with a target mobility management network element of the second network. The following blocks are included.

For block 301 to block 303, refer to block 201 to block 203.

304. The AMF requests a network policy from a PCF, and obtains a correspondence table of slice information and a DCN.

Optionally, a network request includes a PLMN ID. An effect of including the PLMN ID is that a correspondence table corresponding to a PLMN is determined by the PCF based on the PLMN of a target network to which a terminal device moves.

305. The PCF returns a response message to the AMF, and the response message includes the correspondence table of the slice information and the DCN.

Optionally, if the network request includes the PLMN ID, the PCF returns the correspondence table that is of the slice information and the DCN and that corresponds to the PLMN ID.

306. The AMF determines a DCN ID based on the slice information of the terminal device stored by the AMF (for example, Requested NSSAI/Allowed NSSAI), and the correspondence table of the slice information and the DCN.

For a specific process, refer to descriptions in Manner 2 in embodiment 2.

Optionally, the AMF further should determine the DCN ID based on a target movement location of the terminal device.

307. The AMF queries a DNS server or a network repository function (NRF) based on the DCN ID, and obtains information that is of the target MME and that corresponds to the DCN ID.

The information of the target MME may be, for example, an identifier of the MME, and an access address of the MME.

308. The AMF sends a handover request to the target MME, for example, a Relocation Request.

There may be a plurality of pieces of Request NSSAI/Allowed NSSAI. In this case, a priority of a slice should be defined, during a handover, the AMF first selects slice information with a highest priority, that is, Request NSSAI/Allowed NSSAI with a highest priority. The AMF further determines, based on the correspondence table, the DCN ID corresponding to the Request NSSAI/Allowed NSSAI with the highest priority.

Figure 4:
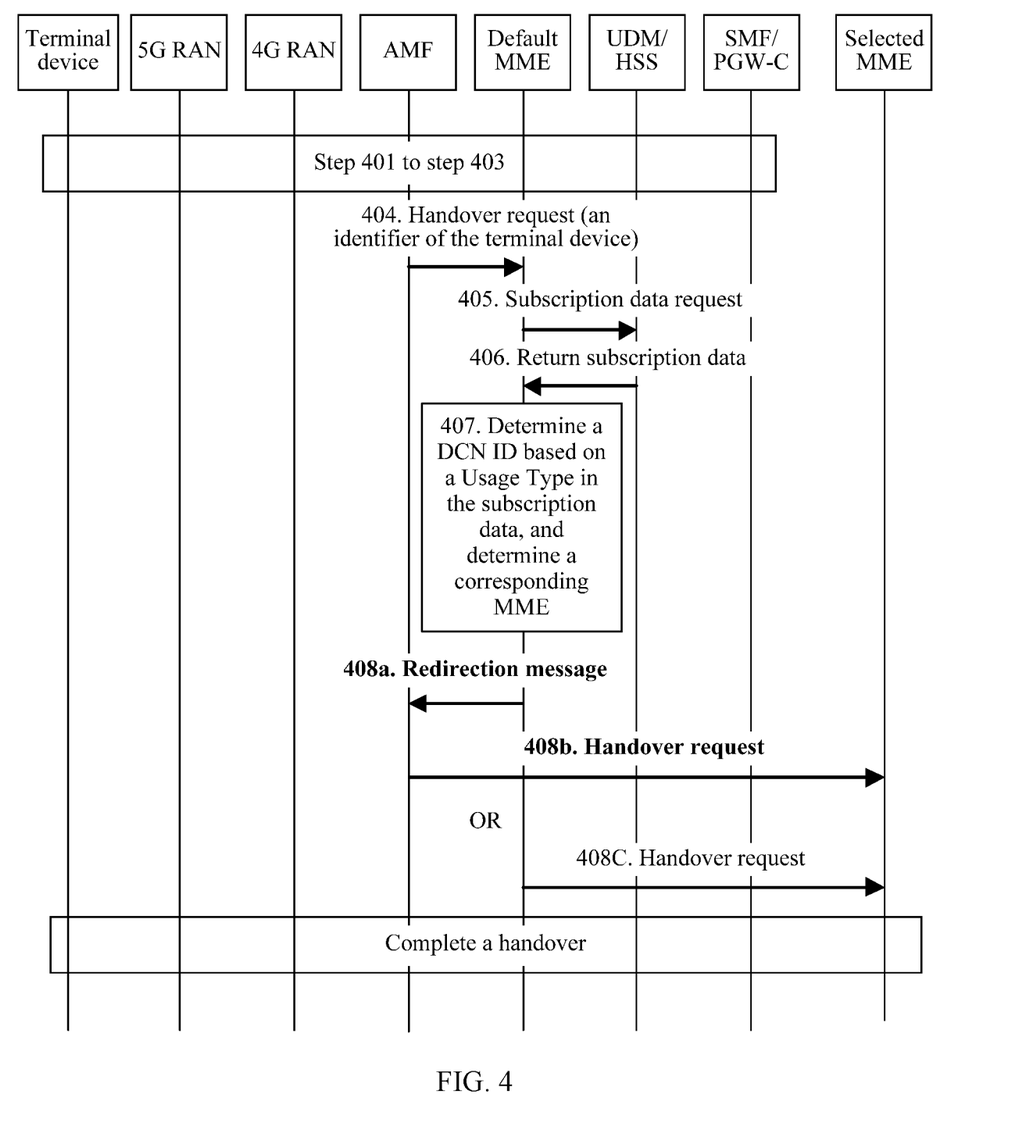
FIG. 4 is a signaling interworking diagram of a handover according to another embodiment of this disclosure.

FIG. 4 is a signaling interworking diagram of a handover according to another embodiment of this disclosure, where 5G is used as an example of a first network, 4G is used as an example of a second network, an AMF is used as an example of a mobility management network element of the first network, a default MME is used as an example of a first mobility management network element of the second network, and a target MME is used as an example of a target mobility management network element of the second network for description. It may be understood that, the AMF may be replaced with the mobility management network element of the first network, the default MME may be replaced with the first mobility management network element of the second network, and the target MME may be replaced with the target mobility management network element of the second network. The following blocks are included.

For block 401 to block 403, refer to block 201 to block 203.

404. The AMF selects one default MME, and forwards a handover request to the default MME. The handover request includes an identifier of a terminal device.

Optionally, the handover request further carries a context.

The default MME may be a special default MME in a 4G network, or may be an MME randomly selected by the AMF, and the MME may not serve the terminal device.

405. The default MME sends a subscription data query request to an HSS, and the subscription data query request includes the identifier of the terminal device.

406. The HSS returns subscription data information corresponding to the terminal device to the default MME, and the subscription data information includes a Usage Type of the terminal device.

407. The default MME determines a DCN ID based on the Usage Type of the terminal device (the prior art). If the default MME can support the DCN ID, the default MME receives a handover request message sent by the AMF, and performs a subsequent handover block. If the default MME cannot support the DCN ID, the default MME determines, based on the DCN ID again, an MME network element corresponding to the default MME. A correspondence between the MME network element and the DCN ID is configured on the default MME.

408a. The default MME sends a redirection message to the AMF, and the redirection message includes the information that is of the MME network element and that is determined in block 4, for example, an MME ID or an access address of the MME. Optionally, the redirection message further includes a cause value, to notify the AMF that the handover request should be re-sent to a specified MME network element in the redirection message.

408b. After receiving the message, the AMF re-sends the handover request to the specified MME network element. Optionally, the handover request further carries a context. Alternatively, 408c. The default MME directly sends the handover request received from the AMF to the MME network element determined in block 407.

Figure 5:
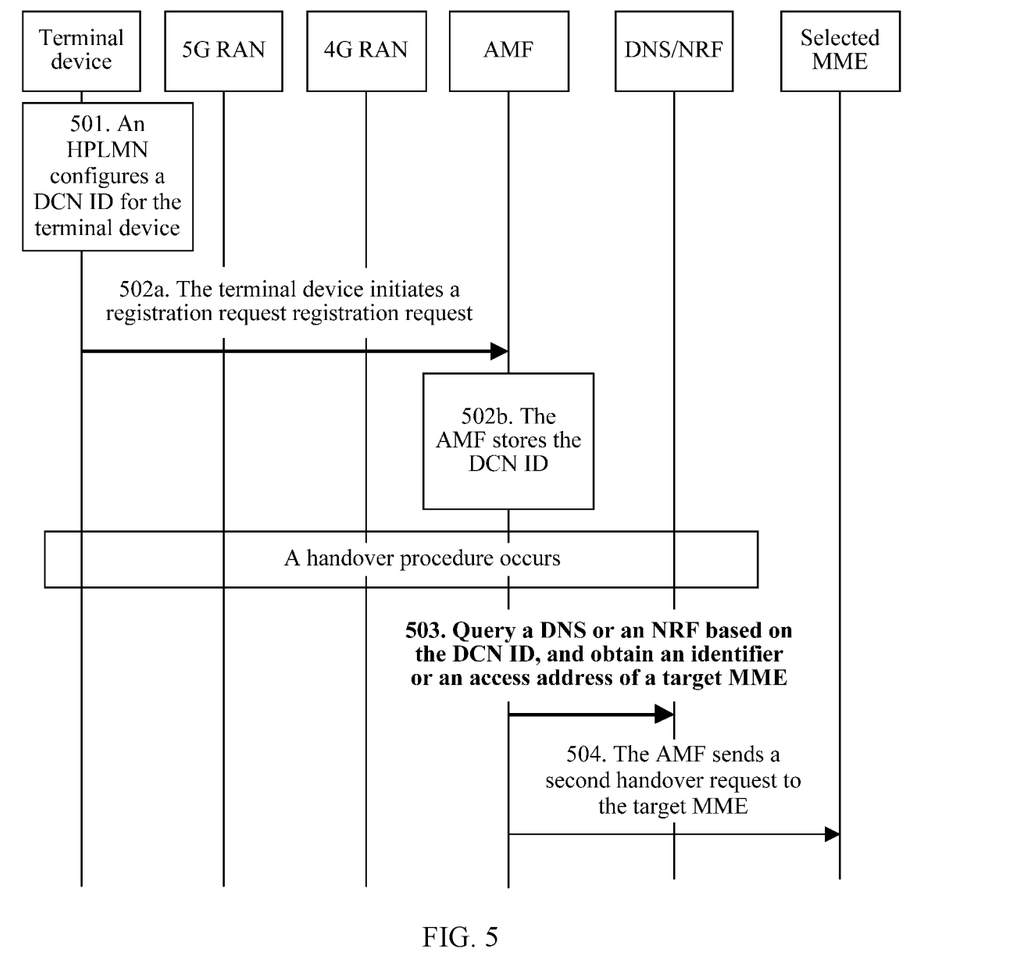
FIG. 5 is a signaling interworking diagram of a handover according to still another embodiment of this disclosure.

FIG. 5 is a signaling interworking diagram of a handover according to still another embodiment of this disclosure, where 5G is used as an example of a first network, 4G is used as an example of a second network, an AMF is used as an example of a mobility management network element of the first network, and a target MME is used as an example of a target mobility management network element of the second network for description. It may be understood that, the AMF may be replaced with the mobility management network element of the first network, and the target MME may be replaced with the target mobility management network element of the second network. The following blocks are included.

501. An HPLMN configures a DCN ID on a terminal device side for a terminal device, and the DCN ID is stored in the terminal device or a SIM card.

502. When initiating registration to a network, the terminal device adds the pre-configured DCN ID to a registration request, for example, a Registration Request, and sends the registration request to the AMF. The AMF stores the DCN ID.

503. When a handover occurs (refer to block 201 to block 203), the AMF queries a DNS server or an NRF based on the stored DCN ID, and obtains information of the target MME, for example, an identifier of the MME, and an access address of the MME.

504. The AMF directly sends a handover request to the target MME.

Figure 6:
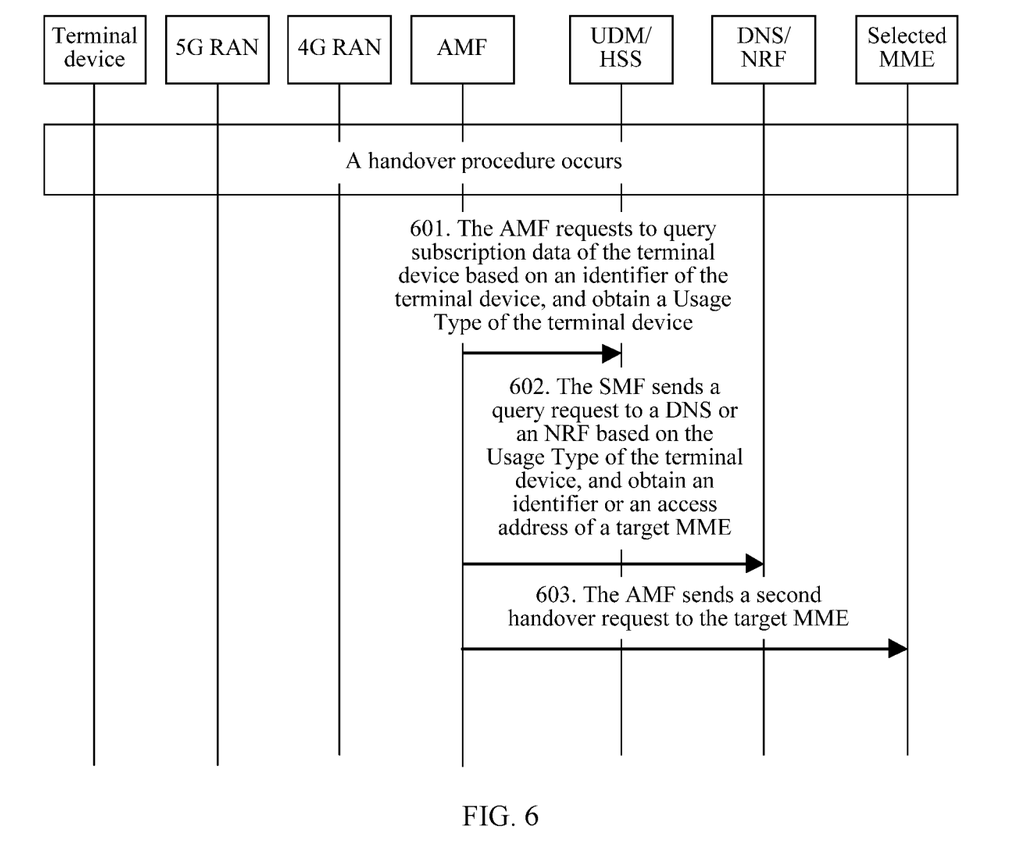
FIG. 6 is a signaling interworking diagram of a handover according to yet another embodiment of this disclosure.

FIG. 6 is a signaling interworking diagram of a handover according to yet another embodiment of this disclosure, where 5G is used as an example of a first network, 4G is used as an example of a second network, an AMF is used as an example of a mobility management network element of the first network, and a target MME is used as an example of a target mobility management network element of the second network for description. It may be understood that, the AMF may be replaced with the mobility management network element of the first network, and the target MME may be replaced with the target mobility management network element of the second network. The following blocks are included.

601. When a handover procedure occurs (refer to block 201 to block 203), the AMF obtains a Usage Type of a terminal device. Specifically, the AMF requests to query a subscription database, for example, an HSS or a UDM based on an identifier of the terminal device. The subscription database returns subscription data of the terminal device, and the subscription data includes the Usage Type of the terminal device.

602. The AMF selects the target MME based on the Usage Type of the terminal device. Specifically, the AMF sends a query request to a DNS or an NRF, the query request includes the Usage Type of the terminal device, and the DNS or the NRF returns an identifier or an access address of the MME based on the Usage Type of the terminal device.

603. The AMF sends a handover request to the target MME.

In this embodiment of this disclosure, function modules of the mobility management network element of the first network and the first mobility management network element of the second network may be divided based on method examples of the foregoing FIG. 2 to FIG. 6. For example, function modules may be divided corresponding to functions, or two or more functions may be integrated into one processing unit. The foregoing integrated module may be implemented in a form of hardware, or may be implemented in a form of a software function module. It should be noted that, in this embodiment of this disclosure, module division is an example, and is merely logical function division. In actual implementation, another division manner may be used.

Figure 7:
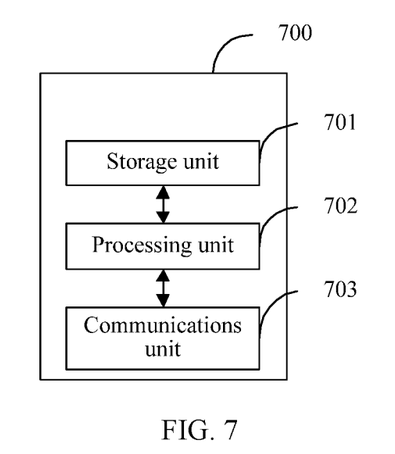
FIG. 7 is a possible schematic structural diagram of a network device according to an embodiment of this disclosure.

When function modules are divided corresponding to functions, FIG. 7 is a possible schematic structural diagram of a network device according to an embodiment of this disclosure, for example, a mobility management network element of a first network and a first mobility management network element of the second network are configured to implement a function of the mobility management network element of the first network in the method embodiments of FIG. 2 to FIG. 6.

The mobility management network element of the first network may include a communications unit 701 and a processing unit 702. The communications unit 701 is configured to support information receiving and sending between the mobility management network element of the first network and another network element in the foregoing embodiments. The processing unit 702 performs various processing functions. For example, the communications unit 701 is configured to support the mobility management network element of the first network in implementing a function of receiving and sending information in related blocks such as block 201, block 205, block 304, block 305, block 308, block 401, block 408a, block 408b, block 502, block 503, or block 504 in FIG. 2 to FIG. 6. The processing unit 702 is configured to support the mobility management network element of the first network in implement a function of processing in related blocks such as block 202, block 203, block 204, block 306, block 307, block 407, or block 502 in FIG. 2 to FIG. 6. Optionally, the mobility management network element of the first network may further include a storage unit 703, and the storage unit 703 is configured to store program code and data of the mobility management network element of the first network.

FIG. 7 may be further a possible schematic structural diagram of a first mobility management network element of a second network according to an embodiment of this disclosure, which is configured to implement the first mobility management network element of the second network in the method embodiments of FIG. 2 to FIG. 6. The first mobility management network element of the second network may include a communications unit 701 and a processing unit 702. The communications unit 701 is configured to support information receiving and sending between the first mobility management network element of the second network and another network element in the foregoing embodiments. The processing unit 702 performs various processing functions. For example, the communications unit 701 is configured to support the first mobility management network element of the second network in performing related blocks such as block 404, block 405, block 406, or block 408c in FIG. 2 to FIG. 6. The processing unit 702 is configured to support the first mobility management network element of the second network in performing related blocks such as block 407 in FIG. 2 to FIG. 6. Optionally, the first mobility management network element of the second network may further include a storage unit 703, and the storage unit 703 is configured to store program code and data of the first mobility management network element of the second network.

It may be understood that, the processing unit 702 in FIG. 7 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this disclosure. The processor may be further a combination of processors implementing a computing function, for example, a combination of one or more microprocessors, or a combination of a DSP and a microprocessor. The communications unit 701 may be a transceiver interface. The storage unit 703 may be a memory.

When the processing unit 702 is a processor, the receiving unit 701 and the sending unit 703 may be a transceiver. When the storage unit is a memory, an NF warehouse management function component and the first mobility management network element of the second network in this embodiment of this disclosure may be the network device shown in FIG. 8.

Figure 8:
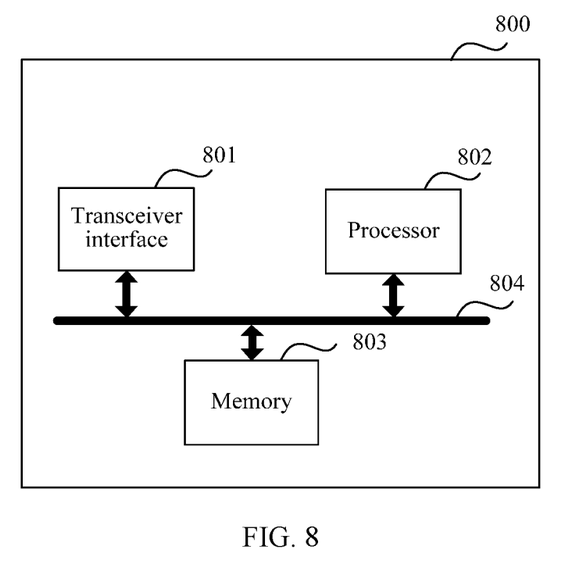
FIG. 8 is another possible schematic structural diagram of a network device according to an embodiment of this disclosure.

As shown in FIG. 8, the network device may include a transceiver interface 801, a processor 802, a memory 803, and a bus 804. The transceiver interface 801, the processor 802, and the memory 803 are connected to each other by using the bus 804. The bus 804 may be a PCI bus, an EISA bus, or the like. The bus may be classified into an address bus, a data bus, a control bus, and the like. For ease of representation, only one thick line is used to represent the bus in FIG. 8, but this does not mean that there is only one bus or only one type of bus.

A person skilled in the art should be aware that in the foregoing one or more examples, functions described in this disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or a dedicated computer.

The objectives, technical solutions, and benefits of this disclosure are further described in detail in the foregoing specific embodiments. It should be understood that the foregoing descriptions are merely specific embodiments of this disclosure, but are not intended to limit the protection scope of this disclosure. Any modification, equivalent replacement or improvement made based on the technical solutions of this disclosure shall fall within the protection scope of this disclosure.

What is claimed is:

1. A method, comprising:
   receiving, by a mobility management network element of a first network, a first handover request sent by an access network of the first network, and learning that a terminal device needs to be handed over to a second network;
   obtaining, by the mobility management network element of the first network, an identifier of the terminal device based on the first handover request;
   determining, by the mobility management network element of the first network, a target mobility management network element of the second network based on the identifier of the terminal device comprising: obtaining, by the mobility management network element of the first network, a target core network identifier of the second network based on the identifier of the terminal device including obtaining, by the mobility management network element of the first network, slice information of the terminal device from a context of the terminal device based on the identifier of the terminal device, obtaining a correspondence between a core network identifier of the second network and the slice information, and, determining the target core network identifier of the second network based on the slice information of the terminal device and the correspondence; and determining, by the mobility management network element of the first network, the target mobility management network element of the second network based on the target core network identifier of the second network, wherein if there are a plurality of pieces of slice information of the terminal device, and the plurality of pieces of slice information of the terminal device are configured with priority information, determining the target core network identifier of the second network based on the slice information of the terminal device and the correspondence further comprises: determining the target core network identifier of the second network based on slice information with a highest priority in the slice information of the terminal device and the correspondence; and
   sending, by the mobility management network element of the first network, a second handover request to the target mobility management network element of the second network, and requesting to hand over the terminal device to the second network.

2. The method of claim 1, wherein determining, by the mobility management network element of the first network, the target mobility management network element of the second network based on the identifier of the terminal device comprises:
   obtaining, by the mobility management network element of the first network, a usage type of the terminal device from a subscription database based on the identifier of the terminal device; and
   determining, by the mobility management network element of the first network, the target mobility management network element of the second network based on the usage type of the terminal device.

3. The method of claim 2, wherein determining, by the mobility management network element of the first network, the target mobility management network element of the second network based on the usage type of the terminal device comprises:
   sending, by the mobility management network element of the first network to a domain name server (DNS) or a network repository function (NRF), a query request carrying the usage type of the terminal device; and
   receiving target mobility management network element information of the second network returned by the DNS or the NRF.

4. The method of claim 1, wherein obtaining a correspondence between the core network identifier of the second network and the slice information comprises:
   sending, by the mobility management network element of the first network, a request message to a policy control function (PCF); and
   receiving, by the mobility management network element of the first network, a correspondence table that is of the core network identifier of the second network and the slice information and that is returned by the PCF.

5. A method, comprising:
   receiving, by a first mobility management network element of a second network, a request message sent by a mobility management network element of a first network, wherein the request message carries an identifier of a terminal device;

obtaining a usage type of the terminal device from subscription data based on the identifier of the terminal device;

determining a target core network identifier of the second network based on the usage type of the terminal device comprising: obtaining, by the mobility management network element of the first network, a target core network identifier of the second network based on the identifier of the terminal device including obtaining, by the mobility management network element of the first network, slice information of the terminal device from a context of the terminal device based on the identifier of the terminal device, obtaining a correspondence between a core network identifier of the second network and the slice information, and, determining the target core network identifier of the second network based on the slice information of the terminal device and the correspondence; and determining, by the mobility management network element of the first network, a target mobility management network element of the second network based on the target core network identifier of the second network, wherein if there are a plurality of pieces of slice information of the terminal device, and the plurality of pieces of slice information of the terminal device are configured with priority information, determining the target core network identifier of the second network based on the slice information of the terminal device and the correspondence further comprises: determining the target core network identifier of the second network based on slice information with a highest priority in the slice information of the terminal device and the correspondence; and returning the target core network identifier of the second network to an access and mobility management function (AMF); or determining the target mobility management network element of the second network based on the target core network identifier of the second network, and returning target mobility management network element information of the second network to the AMF; or determining the target mobility management network element of the second network based on the target core network identifier of the second network, and sending the request message to the target mobility management network element of the second network.

6. The method of claim 5, wherein the target mobility management network element information of the second network comprises: an identifier of the target mobility management network element, or an access address of the target mobility management network element.

7. The method of claim 5, wherein the first network comprises a 5G network, the mobility management network element of the first network is an AMF, the second network comprises a 4G network, and the mobility management network element of the second network comprises a mobility management entity (MME).

8. A mobility management network element that belongs to a first network, the mobility management network element comprising: a transceiver interface and a processor; wherein the transceiver interface is configured to: receive a first handover request sent by an access network of the first network; and learn that a terminal device needs to be handed over to a second network;

the processor is configured to: obtain an identifier of the terminal device based on the first handover request; and determine a target mobility management network element of the second network based on the identifier of the terminal device comprising: obtaining, by the mobility management network element of the first network, a target core network identifier of the second network based on the identifier of the terminal device including obtaining, by the mobility management network element of the first network, slice information of the terminal device from a context of the terminal device based on the identifier of the terminal device, obtaining a correspondence between a core network identifier of the second network and the slice information, and, determining the target core network identifier of the second network based on the slice information of the terminal device and the correspondence; and determining, by the mobility management network element of the first network, the target mobility management network element of the second network based on the target core network identifier of the second network, wherein if there are a plurality of pieces of slice information of the terminal device, and the plurality of pieces of slice information of the terminal device are configured with priority information, determining the target core network identifier of the second network based on the slice information of the terminal device and the correspondence further comprises: determining the target core network identifier of the second network based on slice information with a highest priority in the slice information of the terminal device and the correspondence; and the transceiver interface is further configured to: send a second handover request to the target mobility management network element of the second network; and request to hand over the terminal device to the second network.

9. The mobility management network element of claim 8, wherein the transceiver interface is further configured to obtain a usage type of the terminal device from a subscription database based on the identifier of the terminal device; and the processor is further configured to determine the target mobility management network element of the second network based on the usage type of the terminal device.

10. The mobility management network element of claim 9, wherein to obtain the usage type of the terminal device from the subscription database based on the identifier of the terminal device the transceiver interface further is configured to: send, to a domain name server (DNS) or a network repository function (NRF), a query request carrying the usage type of the terminal device; and receive target mobility management network element information of the second network returned by the DNS or the NRF.

11. The mobility management network element of claim 8, wherein to obtain the correspondence between the core network identifier of the second network and the slice information the processor is further configured to: send a request message to a policy control function (PCF) through the transceiver interface; and receive a correspondence table that is of the core network identifier of the second network and the slice information and that is returned by the PCF.

12. A mobility management network element that belongs to a second network, the mobility management network element comprising: a transceiver interface and a processor; wherein the transceiver interface is configured to receive a request message sent by a mobility management network element of a first network, wherein the request message carries an identifier of a terminal device;

the processor is configured to: obtain a usage type of the terminal device from subscription data based on the identifier of the terminal device; and determine a target core network identifier of the second network based on the usage type of the terminal device comprising: obtaining, by the mobility management network element of the first network, a target core network identifier of the second network based on the identifier of the terminal device including obtaining, by the mobility management network element of the first network, slice information of the terminal device from a context of the terminal device based on the identifier of the terminal device, obtaining a correspondence between a core network identifier of the second network and the slice information, and, determining the target core network identifier of the second network based on the slice information of the terminal device and the correspondence; and determining, by the mobility management network element of the first network, a target mobility management network element of the second network based on the target core network identifier of the second network, wherein if there are a plurality of pieces of slice information of the terminal device, and the plurality of pieces of slice information of the terminal device are configured with priority information, determining the target core network identifier of the second network based on the slice information of the terminal device and the correspondence further comprises: determining the target core network identifier of the second network based on slice information with a highest priority in the slice information of the terminal device and the correspondence; and the transceiver interface is further configured to return the target core network identifier of the second network to an access and mobility management function (AMF); or the processor is configured to determine the target mobility management network element of the second network based on the target core network identifier of the second network, and the transceiver interface is further configured to return target mobility management network element information of the second network to the AMF; or the processor is configured to determine the target mobility management network element of the second network based on the target core network identifier of the second network, and the transceiver interface is further configured to send the request message to the target mobility management network element of the second network.

13. The mobility management network element of claim 12, wherein the target mobility management network element information of the second network comprises: an identifier of the target mobility management network element, or an access address of the target mobility management network element.

14. A communications system, comprising a mobility management network element that belongs to a first network and a mobility management network element that belongs to a second network, wherein:

the mobility management network element that belongs to the first network is configured to:

receive a first handover request sent by an access network of the first network, and learn that a terminal device needs to be handed over to a second network;

obtain an identifier of the terminal device based on the first handover request;

determine a target mobility management network element of the second network based on the identifier of the terminal device comprising: obtaining, by the mobility management network element of the first network, a target core network identifier of the second network based on the identifier of the terminal device including obtaining, by the mobility management network element of the first network, slice information of the terminal device from a context of the terminal device based on the identifier of the terminal device, obtaining a correspondence between a core network identifier of the second network and the slice information, and, determining the target core network identifier of the second network based on the slice information of the terminal device and the correspondence; and determining, by the mobility management network element of the first network, the target mobility management network element of the second network based on the target core network identifier of the second network, wherein if there are a plurality of pieces of slice information of the terminal device, and the plurality of pieces of slice information of the terminal device are configured with priority information, determining the target core network identifier of the second network based on the slice information of the terminal device and the correspondence further comprises: determining the target core network identifier of the second network based on slice information with a highest priority in the slice information of the terminal device and the correspondence; and send a second handover request to the target mobility management network element of the second network, and requesting to hand over the terminal device to the second network.

* * * * *